March 22, 1966  J. P. MORLEY  3,241,844
END FACE SEAL ASSEMBLY WITH INSTALLATION RETENTION MEANS
Filed May 22, 1963
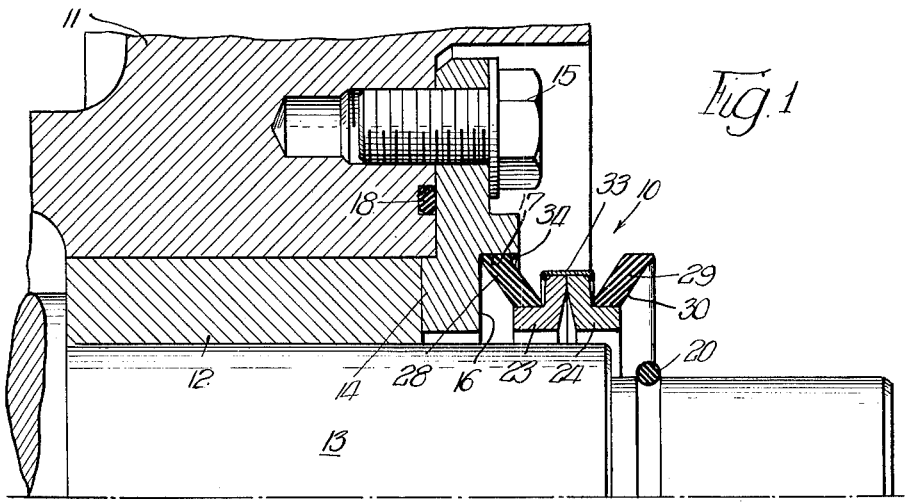
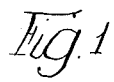
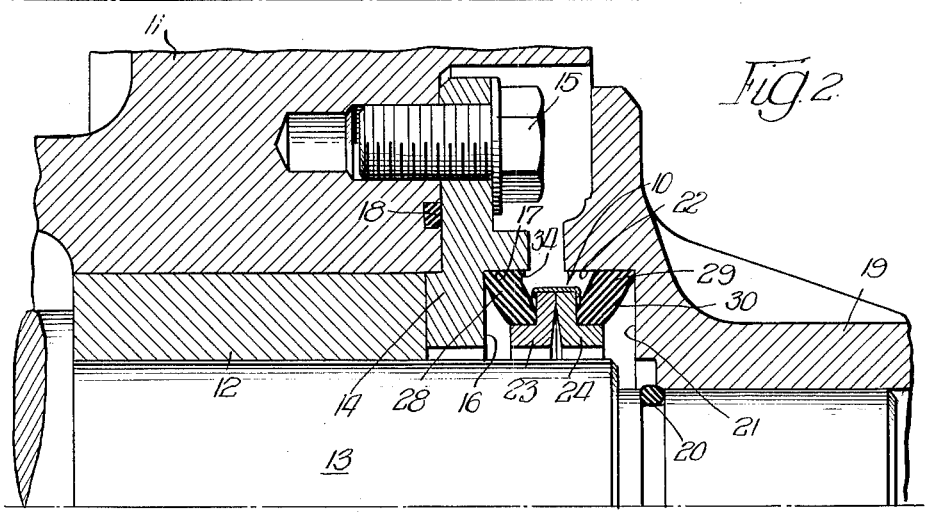
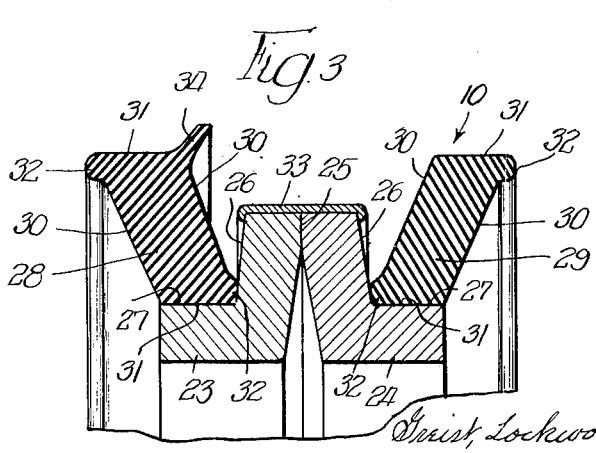
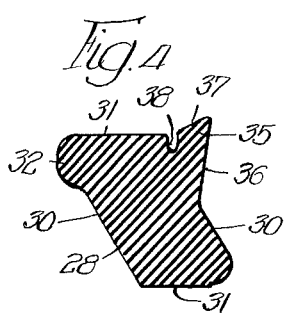
INVENTOR.
James P. Morley,
BY
Grist, Lockwood, Greenawalt + Dewey
Attys.

United States Patent Office 3,241,844
Patented Mar. 22, 1966

3,241,844
END FACE SEAL ASSEMBLY WITH INSTALLATION RETENTION MEANS
James P. Morley, Morton Grove, Ill., assignor to Chicago Rawhide Mfg. Company, Chicago, Ill., a corporation of Illinois
Filed May 22, 1963, Ser. No. 282,278
4 Claims. (Cl. 277—92)

The invention is directed to a new and improved form of end face seal assembly of the rotary type, the assembly being of a design based on that disclosed in the copending application Serial No. 155,640 filed November 29, 1961, the disclosure of which is hereby incorporated by reference.

In the aforementioned copending application, the basic seal assembly disclosed comprises at least one sealing ring having engaged therewith a frusto-conical gasket-type secondary sealing member formed from distortively compressible rubber-like material and being in one end engagement with the sealing ring rearwardly of the sealing face thereof and projecting angularly rearwardly therefrom. With this relatively uncomplicated type of seal assembly it has been found that the compressible sealing member used when properly axially and radially confined in the installed condition of the assembly provides new and improved internal gasketing due to the provision of a substantial radial force component and a completely adequate axial force component. The preferred form of the assembly includes the provision of circumferentially continuous, angularly related surfaces rearwardly of the sealing face of the sealing ring against which an end portion of the secondary sealing member is received. This particular design permits ready separate fabrication of the elements of the assembly, ready combining thereof and adequate retention of the separate secondary sealing member on the sealing ring during installation thereof. The end portion of the secondary sealing member frictionally engages the angularly related surfaces of the sealing ring and the member is held thereon prior to and during installation.

Another desirable feature of the basic design involves the combining of a pair of sealing rings in face-to-face engagement with each ring being backed-up by a compressible secondary sealing member. With this particular arrangement the sealing rings themselves in the installation provide the basic rotary sealing action thus eliminating the necessity of utilizing a permanent part of an installation as a mating surface. The "floating" mounting of the combined sealing rings in an installation by the cooperative action of the opposed frusto-conical sealing members provides seal positioning and balancing functions confined solely within the seal assembly itself thus avoiding reliance on any permanent parts of the installation as necessary to proper installational use of the seal assembly. This particular arrangement also permits self-containing of the seal assembly prior to and during installation thereof as the engaged sealing rings can be suitably attached to one another by the use of ultimately destructible strip-like closure means.

However, it has been found that when the seal assemblies of the type described above are installed in a bore or the like, gravity action can cause the assemblies to become at least slightly dislodged to an extent that the assembly may become undesirably "cocked" in the bore before total installation has been completed. In this respect the frusto-conical secondary sealing members used are relied upon to establish frictional engagement with surface portions of the installation, the friction developed being adequate to offset the tendency of the seal assembly to become dislodged. In at least some installations the sealing ring used is of substantial diameter and weight and it has been found that the initial friction developed by the secondary sealing member with the part in the uncompressed condition of the secondary sealing member is inadequate to retain the seal assembly in its proper position for final assembly of the installation.

Additionally, upon axial and radial compression of a secondary sealing member of the type described, it has been found that edge portions thereof have a tendency to separate from the surfaces with which the secondary sealing member is engaged. While edge portion separation will not defeat the highly desirable internal gasketing function of the frusto-conical secondary sealing member, such separation nevertheless permits the introduction of foreign matter which can promote abrasive wear in the most effective gasketing areas of the secondary sealing member.

It is an object of the invention to provide a new and improved end face seal assembly and installation thereof involving the provision of specially located means forming a part of frusto-conical secondary sealing members of the assembly and capable of maintaining frictional as well as sealing engagement with surface areas on which the secondary sealing members are mounted to prevent displacement of the seal assembly during installation thereof as well as prevent the introduction of foreign matter along an edge portion during operational use of the seal assembly.

A further object is to provide a new and improved end face seal assembly of the type described wherein a sealing ring is backed-up by a frusto-conical secondary sealing member of compressible material, the secondary sealing member including as a part thereof projecting barb or lip-like means located to initially establish and maintain frictional engagement of the secondary sealing member with a part on which the same is mounted.

Still a further object is to provide a new and improved form of distortively compressible frusto-conical secondary sealing member for use in a seal assembly which basically consists of at least one such member in end engagement with a sealing ring and adapted to be axially and radially compressed between the ring and a part of an installation to establish and maintain axial and radial force components for end face sealing and internal gasketing.

Other objects not specifically set forth will become apparent from the following detailed description of the invention made in conjunction with the accompanying drawings wherein:

FIG. 1 is a fragmentary half section of a track roller installation illustrating the basic form of end face seal assembly of the invention in its initially installed position prior to complete final assembly of the installation;

FIG. 2 is a view similar to FIG. 1 illustrating completed installation of the seal assembly;

FIG. 3 is an enlarged fragmentary section of the seal assembly prior to installation thereof; and FIG. 4 is an enlarged section of a modified form of frusto-conical secondary sealing member adapted for use with the seal assembly.

FIGS. 1 and 2 illustrate a typical track roller installation including the preferred "mirror image" form of the seal assembly of the invention, this form being identified by the numeral 10. The installation includes a track roller 11 mounted on a main bearing 12 for rotation about a shaft 13. A thrust plate 14 is fixed to the roller 11 by a plurality of fasteners 15 and engages the outer end of the main bearing 12. The thrust plate 14 is formed with an outer surface annular recess defined by a radial surface 16 and an axial surface 17 which are joined at right angles. A suitable O-ring unit 18 forms a seal between the thrust plate and track roller 11. The basic track roller installation is completed as shown in FIG. 2 by a track shaft cap 19 which is suitably fixed on the roller shaft 13 and which is axially movable outwardly therealong for seal assembly installation. The cap 19 includes suitable fastner means (not shown) to fix the same on the shaft 13. An O-ring sealing unit 20 is located between the outer reduced end of the shaft 13 and the cap 19. This cap includes an inwardly opening annular recess portion defined by a radial wall surface 21 joined with an axial wall surface 22 in right angle relation. The seal assembly 10 is mounted about the shaft 13 in spaced relation therewith and is engaged between the thrust plate 14 and cap 19 (FIG. 2) in the final installed condition thereof.

FIG. 3 best illustrates the preferred form of seal assembly 10. This assembly comprises a pair of cooperating sealing rings 23 and 24 having inner diameters greater than the diameter of the shaft 13. The rings 23 and 24 are of the same design and each may be considered a sealing ring or one may be considered the sealing ring and the other the mating ring or member. The rings 23 and 24 each include an end face annular sealing surface 25 which as illustrated is located adjacent the outer peripheral edge of the radially directed segment of each ring. These rings are of generally L-shape and each ring is formed with a right angled outwardly facing recess defined by a radial wall surface 26 and an axial wall surface 27. As best shown in FIG. 2, the sealing ring surfaces 26 and 27 are arranged relative to the cooperating thrust plate surfaces 16 and 17 and cap surfaces 21 and 22 to geometrically define therewith a generally rectangular secondary seal area.

The secondary seal for each of the sealing rings 23 and 24 is provided by elastomers 28 and 29, respectively, each of which is of generally frusto-conical shape and formed from rubber or rubber-like material which is distortively compressible. Each secondary sealing member 28 and 29 is provided with parallel inclined side surfaces 30 and opposite end axial surfaces 31. In the form illustrated, the leading edge of each end portion of each secondary sealing member may be formed with a circumferentially continuous, outwardly projecting rib-like member 32 of semi-cylindrical shape to provide a slight excess of compressible material for complete filling of the junctures of the right angled surface areas of the sealing rings and track roller parts. Depending upon installational use of the seal assembly, it may be desirable to utilize the rib-like members 32 as a means for providing an extra leading edge seal to prevent the introduction of foreign particles or the like between the leading edge portions of the secondary sealing members and the part surfaces with which they are engaged. However, it will be understood that in many installations this particular configuration is not necessary and the leading edges of the end portions of the secondary sealing members may be each formed by a conventional radius.

In the preferred form of the seal assembly illustrated, the "mirror image" design especially accommodates sealing ring interconnection to establish a unitized or self-contained total assembly. As disclosed in the aforementioned copending application, a strip-like closure member 33 may extend about the outer surfaces of the sealing rings 23 and 24 in overlapping and engaging relation therewith to hold the sealing rings in face-to-face engagement. The secondary sealing members 28 and 29 are dimensioned to establish an interference fit on the axial surfaces 27 of the sealing rings thus providing for frictional assembly of the secondary sealing members to the sealing rings without the need of utilizing additional parts. The closure strip 33 may be of any suitable material such as a cellulose band or gum tape which is adequate to hold the sealing rings 23 and 24 together as illustrated and yet is subject to disintegration during operative use of the seal assembly. In this respect the sealing rings 23 and 24 will establish a running end face sealing operation therebetween in the track roller installation and the force of the rotary sealing action will be adequate to break or disrupt the closure strip 33 with the material thereof being selected to permit ultimate disintegration thereof without damage to the seal or any moving parts thereof.

With the seal assembly 10 described, the entire assembly in unitized form can be operatively installed in the mounting recess of the thrust plate 14 as shown in FIG. 1. Depending upon the size of the seal assembly and particularly the weight of the sealing rings 23 and 24 thereof, the interference fit and friction established between the outer end portion axial surface 31 of the secondary sealing member 28 and the axial surface portion 17 of the thrust plate 14 may be adequate to hold the unitized seal assembly in proper position until the track shaft cap 19 is appropriately installed and fastened as shown in FIG. 2. However, it has been found that in many installations a single secondary sealing member is incapable of adequately retaining the unitized seal assembly in proper position for ready and efficient track shaft cap installation and fastening. The action of gravity alone on the seal assembly can be adequate to cause the secondary sealing member 28 to deform sufficinetly to either provide for misalignment of the associated parts of the seal assembly or result in slippage between the secondary sealing member 28 and the axial surface 17 of the thrust plate 14 so that the seal assembly becomes cocked in the installation.

In order to overcome the foregoing difficulty, the frusto-conical secondary sealing member 28 along the trailing edge portion of the outer end portion thereof is formed with a circumferentially continuous, outwardly and oppositely directed flexible lip portion 34 which is formed from sufficient material and is of sufficient resilience to frictionally engage the axial surface 17 of the thrust plate 14 and prevent slippage of the secondary sealing member 28 and undesirable cocking of the seal assembly. The lip portion 34 is in the form of a barb which resists withdrawal of the secondary sealing member 28 from the mounting area of the thrust plate 14 while readily permitting easy insertion of the secondary sealing member 28 in the mounting area. In a broad sense, at least one of the frsuto-conical secondary sealing members is formed along a trailing edge portion thereof with a rearwardly and outwardly projecting retention lip arranged to engage a divergent surface of a part of the installation to retain the seal assembly in proper alignment in the installation during final assembly operations.

By way of example, the retention lip 34 may be directed at an angle at approximately 45° relative to the horizontal or vertical. The lip may be relatively fragile as it is quite conceivable that it would be relied upon solely for installation purposes and need not be capable of performing any specific sealing function during use of the seal assembly. However, if desired, the lip 34 can be so dimensioned and arranged to provide an independent sealing function over and above its initial seal assembly retention function. Such an arrangement is shown in FIG. 4 wherein a flexible lip portion 35 is formed integrally along a side surface 30 of the frusto-conical secondary sealing member 28 and includes an outer surface 36 extending at approximately 10° from the vertical and joined at the tip thereof with an inclined lip surface 37 which in the relaxed condition extends at approximately 20° offset from the horizontal. The lip 35 is relatively thick and yet adequately flexible so that the same will be compressed as a result of engagement with the thrust plate surface 17 to frictionally grip the same and maintain the seal assembly in its proper operative position. Adequate flexibility is imparted to the lip 35 by provision of a circumferentially continuous recess 38 located at the base of the lip surface 37. The lip surface provides a substantial area contact thus maintaining sealing engagement with the surface 17 of the thrust plate throughout the operational life of the seal assembly thereby preventing the ingress of foreign particles which abrade the secondry sealing member in the area of gasket sealing action. In this respect the lip 35 provides added material which in severe abrasion applications can be worn away thereby protecting the secondary member and its basic functions.

In the operation of a seal of the type described it has been found that upon axial and radial compression of the secondary sealing members as shown in FIG. 2 the edge portions of the secondary sealing members may have a tendency to withdraw from the adjacent sealing surfaces of the installation. Such withdrawal can tend to trap abrasive particles. While such particles can abrade the exposed edge portion of a secondary sealing member it would not be expected that any material damage would occur of a nature interferring with the desirable gasketing effect provided by the sealing member. Nevertheless, abraded areas can ultimately affect the life of the elastomeric material by possibly aiding in the advancement of deterioration thereof, and in more severe applications it can well be advantageous to provide a positive sealing lip action of the type shown in FIG. 4 which at least minimizes particle trapping or the like.

FIG. 2 illustrates final installation of the seal assembly 10 and the axial and radial compression of the secondary sealing members 28 and 29 is at least diagrammatically illustrated. In view of the substantial compressive distortion required of the secondary sealing members, it will be borne in mind that it is quite possible to initially dimension the secondary sealing member 28 with an outer diameter loose fit relative to the axial mounting surface 17 of the thrust plate 14. In other words it is not essential that the seal assembly 10 exhibit such close tolerances relative to the installation parts that an initial interference fit occurs between the secondary sealing member 28 and the axial surface 17. Under such circumstances (which are the most likely) the retention lip 34 is of material value as it is basically the only component solely responsible for initial proper positioning of the seal assembly for final installation closure.

As fully disclosed in the aforementioned copending application, the particular seal assembly described herein provides in a simple, economical manner an axial face load for the sealing rings and a radial sealing force to maintain efficient gasketing effect by the secondary sealing member. Final installation as shown in FIG. 2 results in substantial axial and radial compression of the secondary sealing members without buckling to supply efficient seal face loading and relatively high contact force for secondary sealing and torque transmission to the sealing ring. The secondary sealing members are in shear end compression and the installed angularity thereof should preferably fall within the range of from about 40° to 90° relative to the center axis of the sealing ring.

While a "mirror image" type of seal assembly 10 has been described in conjunction with the use of the concepts of this invention, it will be understood that such concepts are readily applicable to single ring units utilizing one frusto-conical secondary sealing member which places the single ring in end face rotary engagememt with a suitable mating surface either forming a part of the installation or being provided in any other suitable manner. Furthermore, it will be understood that the retention lip 34 can be supplied to each secondary sealing member along any desired edge portion thereof even in multiple relation on a single secondary sealing member if desired. The amount of material utilized in forming the retention lip is minimal thus readily permitting uniform manufacture of the secondary sealing member. Furthermore, the particular location of the retention lip permits universal use of the secondary sealing member as the lip will always be positioned to permit ready receiving of divergent mounting surfaces about the adjacent end portion of the secondary sealing member. While the secondary sealing members illustrated project angularly outwardly relative to a sealing ring, it will be understood that the principles of the invention may be readily and advantageously used in seal assemblies wherein a frusto-conical secondary sealing member extends angularly inwardly relative to the sealing ring.

Obviously certain modifications and variations of the invention as hereinbefore set forth may be made without departing from the spirit and scope thereof, and therefore only such limitations should be imposed as are indicated in the appended claims.

I claim:

1. In an end face seal assembly adapted for operative mounting between relatively rotatable parts, said seal assembly comprising a sealing ring having a sealing surface along an end face thereof, and a secondary sealing member of solid block-like generally parallelogram cross-sectional configuration formed from distortively compressible elastomeric material for operative force loading of said sealing ring and having opposite generally axially extending surfaces defining end portions thereof, one end portion of said secondary sealing member being in frictionally retaining engagement with said sealing ring in a seat formed in said sealing ring rearwardly of the sealing surface thereof, said secondary sealing member extending axially rearwardly from said sealing ring and projecting radially relative to said sealing surface, said secondary sealing member constituting the sole support for said sealing ring during mounting of said seal assembly on a part, the opposite end portion of said secondary sealing member being adapted for end surface sealing engagement with divergent surface portions including an axially directed surface portion of a part upon operative mounting of said seal assembly, the improvement comprising at least said opposite end portion of said secondary sealing member having formed along the axially extending surface thereof a radially directed lip-like projection adapted for frictional engagement with said axially directed surface portion of said part to hold said seal assembly in its entirety against displacement relative to said part during installation of said seal assembly and at least prior to final installational force loading thereof.

2. The seal assembly of claim 1 wherein said lip-like projection is circumferentially continuous and projects rearwardly and outwardly from the trailing edge portion of said opposite end portion of said secondary sealing member in relation to the direction of installation of said seal assembly on said part.

3. The seal assembly of claim 1 wherein the leading edge portion of said opposite end portion of said secondary sealing member in relation to the direction of installation of said seal assembly on said part is formed with an axially projecting rib-like portion providing an excess of material for engagement with said divergent surface portions of said part to fill the juncture thereof.

4. The seal assembly of claim 1 wherein said sealing ring seat is defined by divergent surface portions and each of the oppoiste end portions of said secondary sealing member is formed along the leading edge portion thereof either in engagement with said sealing ring seat or adapted for engagement with said part with an axially projecting rib-like portion providing an excess of material to fill the junctures of the divergent surface portions of said sealing ring seat and said part.

References Cited by the Examiner

UNITED STATES PATENTS

| | | | |
|---|---|---|---|
| 2,167,669 | 8/1939 | Molyneux | 277—92 |
| 2,289,274 | 7/1942 | Krug | 277—42 |
| 2,365,046 | 12/1944 | Bottomley | 277—92 |
| 2,590,759 | 3/1952 | Dale et al. | 277—92 |
| 2,871,039 | 1/1959 | Payne | 277—38 |
| 3,086,782 | 4/1963 | Peickii et al. | 277—92 |
| 3,110,097 | 11/1963 | Yocum | 277—9 |

LAVERNE D. GEIGER, *Primary Examiner.*

SAMUEL ROTHBERG, LEWIS J. LENNY, *Examiners.*

Dedication 3,241,844.—*James P. Morley*, Morton Grove, Ill. END FACE SEAL ASSEMBLY WITH INSTALLATION RETENTION MEANS. Patent dated Mar. 22, 1966. Dedication filed Mar. 16, 1972, by the assignee, *Chicago Rawhide Mfg. Company*.

Hereby dedicates to the Public the remaining term of said patent.

[*Official Gazette June 13, 1972.*]